INVENTOR.
ORAN C. WILSON

June 16, 1953      O. C. WILSON      2,641,848
APPARATUS FOR DRYING GRANULAR MATERIAL Filed June 22, 1949      2 Sheets-Sheet 2

INVENTOR.
ORAN C. WILSON
BY
Bates, Teare & McBean
Attorneys

Patented June 16, 1953

2,641,848

UNITED STATES PATENT OFFICE 2,641,848

APPARATUS FOR DRYING GRANULAR MATERIAL

Oran C. Wilson, Sandusky, Ohio, assignor, by mesne assignments, to Thoreson-McCosh, Inc., Detroit, Mich., a corporation of Michigan Application June 22, 1949, Serial No. 100,611

2 Claims. (Cl. 34—48)

This invention pertains to a method and apparatus for drying and pre-heating granular material, particularly that type of granular material that is used in the manufacture of plastic articles prior to molding or extruding.

One of the difficulties in manufacturing articles of plastic material, particularly where the material is introduced in granular form into a molding or extrusion machine, is the exclusion of moisture from the material, for the presence of moisture introduces an objectionable variable condition in the molding operation. One method heretofore used for drying the material has been to place it upon a shallow pan and drive the moisture out of it by the application of heat. An objection to this arrangement, however, has been the high cost of handling the material and also the fact that the material might become cooled during transfer from the pan to the hopper and before it is eventually used, and thus pick up a certain percentage of moisture.

Another form of apparatus attempted for solving the problem in question has been to introduce air into a hopper through a chest or liner which surrounds the hopper, but it has been found that such arrangement introduced air only around the periphery of the hopper with the result that a large portion of the material passed through the center of the hopper without being adequately dried.

An object of the present invention is to dry the granular, or powdered, material effectively as it is moving through the hopper into a molding or extrusion machine, thereby to eliminate the objections due to the methods of drying heretofore used. An additional object is to provide an apparatus by means of which all of the material passing through the hopper will be adequately dried regardless of whether the machine is actuated continuously or intermittently.

Figure 1:
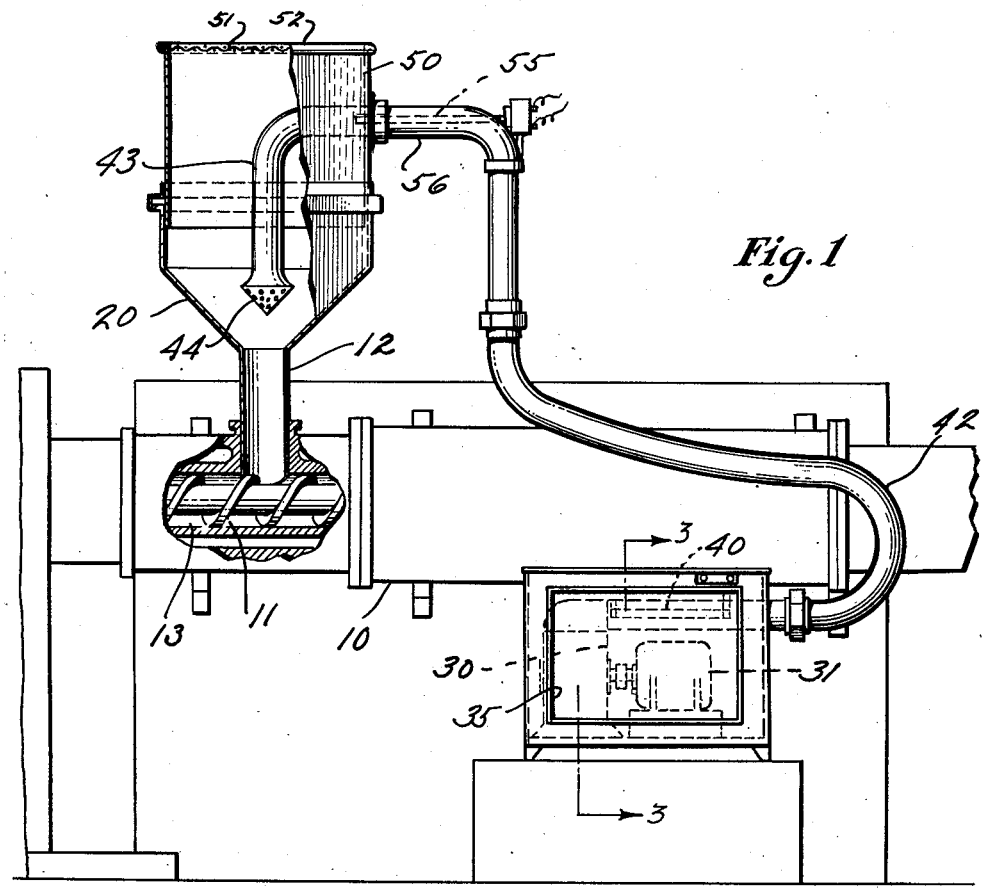
Figure 2:
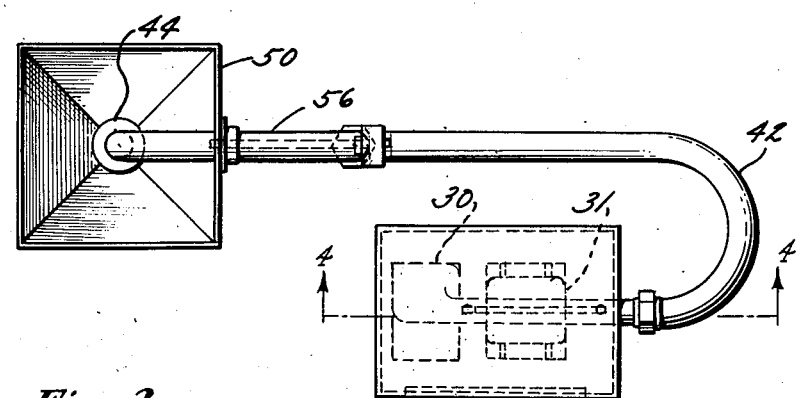
Figure 3:
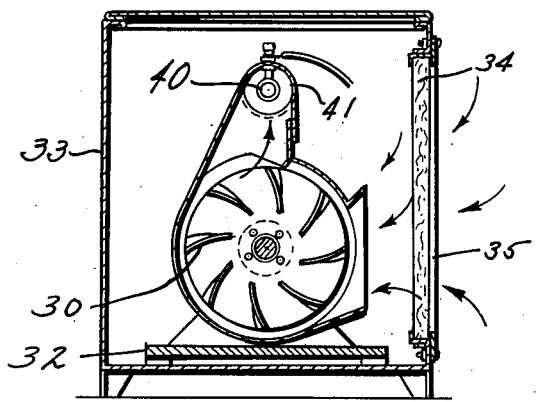
Figure 4:
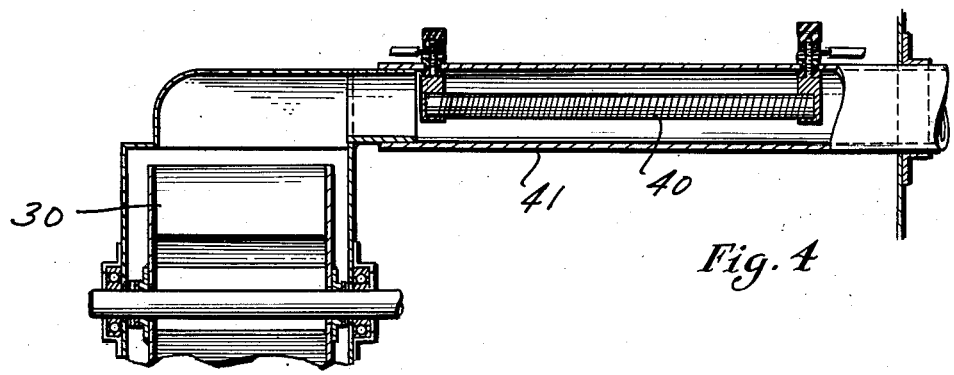
Figure 5:
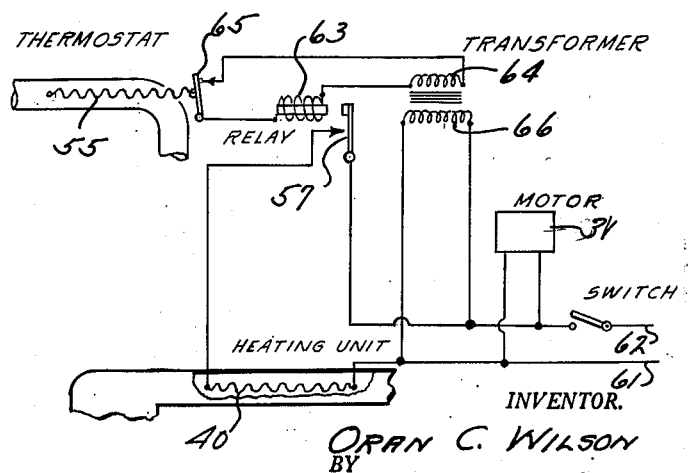

In the drawings, Fig. 1 is a side elevation, partly in section, of an apparatus embodying the present invention; Fig. 2 is a top plan view of the apparatus shown in Fig. 1 with the top cover, removed; Fig. 3 is a section taken on a plane indicated by the line 3—3 in Fig. 1; Fig. 4 is a section taken on the plane indicated by the line 4—4 in Fig. 2, and Fig. 5 is a wiring diagram.

The present invention is shown in connection with an extrusion machine, indicated in general at 10, as having a screw conveyor 11 which is arranged to be rotated in the usual way for forcing plastic material from a chute 12 into the chamber 13, from whence it is ejected into the mold. The material in granular form is fed to the chute 12 through a hopper 20 which normally has adequate capacity to maintain continuity of operation of the extrusion machine.

The present invention is concerned with the apparatus for applying the material within the hopper as it is moving into the machine, and the invention is carried out by utilizing a drying apparatus in the form of a heater and blower unit which operates to force heated air through the material, and in a direction reversely to the path of travel of the material through the hopper.

A preferred apparatus for drying the granular material embodies a blower 30 which is adapted to be driven by a motor 31, both of which are mounted upon a base 32 within a box-like housing 33. A screen 34 filters the air as it enters an opening 35 in one wall of the housing, while a heater 40 in the form of a coil of electric resistance wire is utilized for heating the air as it flows through a discharge conduit 41. A flexible conduit 42 connects the conduit 41 to a discharge pipe 43 which terminates in a nozzle 44 in the form of a perforated conical head within the hopper 20 and adjacent the lower end thereof. The pipe 43 is carried by an extension 50 which rests upon the hopper. A screen 51 carried by a lid 52 allows the air to escape, but prevents particles of plastic material from being blown out the top of the extension.

To regulate the flow of air into the hopper, I provide a thermostat 55 which in Fig. 1 is shown as extending into the horizontal reach 56 of the conduit, and which operates to energize the heating unit so as to maintain the temperature of the air within predetermined limits.

A suitable wiring diagram is shown in Fig. 5, wherein current for the heating unit may be supplied through service lines 61 and 62. The current may be controlled by the operation of a switch 57 which is adapted to be actuated by a relay 63 which is in series with the secondary 64 of a transformer, and with a switch 65 that is controlled by the thermostat 55. The primary 66 of the transformer and the motor 31 are connected across the line. Thus the motor may operate continuously to cause a moving current of air to flow into the hopper, but the temperature of the air may be controlled in accordance with the desired limits of operation.

An advantage of the present invention is the fact that the heater and blower unit, together with the conduit for conducting and discharging air into the hopper may be constructed independently of existing machines, and may be applied thereto as an accessory without necessitating extensive changes in the construction thereof. The apparatus may be manufactured economically and may be readily installed without occupying an exorbitant amount of floor space adjacent the machine to which it is applied. Although I have illustrated an extrusion machine in the drawings, it is to be understood that the present invention is equally adapted for use on injection molding machines. Moreover, the invention is advantageous in that it preheats the material to a uniform degree and thus avoids difficulties in molding which would result from attempts to use material which has been stored in a cold stock room.

I claim:

1. An apparatus for treating material in granular or powdered form while it is fed to a delivery means comprising in combination, a receiving hopper having a material discharge at its lower end, a hopper extension having an air pervious cover removably supported on the receiving end of the hopper, an air conduit carried by the hopper extension and projecting downwardly into the hopper, said air conduit terminating in a conical apertured discharge head in surmounting spaced relation from the hopper material discharge, a blower unit adapted to be supported in proximity to said delivery means, said blower unit having an air delivery conduit, a tubular flexible air delivery connection from the blower air delivery conduit to the hopper air conduit, an electric heater in the blower conduit, a thermostat in the hopper conduit, an electrical switch under control of said thermostat, electrical energizing means interconnecting the switch and heater to control the air temperature in the hopper air conduit, and means for coupling the hopper material discharge to the material delivery means to provide a closed material delivery path from the hopper, whereby the heated air flow from the blower unit is guided upwardly from the hopper air discharge through the material in the hopper and outwardly through the air pervious cover on the hopper extension.

2. An apparatus for drying material in granular or powdered form while it is fed to a delivery means comprising in combination, a material-receiving hopper having downwardly converging boundary walls terminating in a material discharge opening at the lower end thereof, a hopper extension removably supported on the material receiving end of the hopper and having an air pervious cover thereon, an air delivery and conduit carried by the hopper extension and projecting downwardly into the hopper, said air delivery conduit having a downwardly tapered conical air discharge head in surmounting spaced relation from the hopper discharge opening, said head having surface apertures for discharging air laterally toward the downwardly converging walls of the hopper, a blower unit having an enclosure with an air pervious inlet and adapted to be supported in proximity to the material delivery means, an air delivery conduit within the enclosure, an electrical heater element within the blower air delivery conduit, a flexible tubular air delivery connection between the blower air delivery conduit and the hopper air delivery conduit, a thermostat in the hopper air delivery conduit and having an electrical switch operatively coupled thereto, means for connecting a source of electrical energy through the switch to the electrical heater element to thermostatically control the air temperature in the hopper air delivery conduit, and means for removably connecting the hopper material discharge opening to the material delivery means to provide a closed material delivery path from the hopper, whereby the heated air flow from the blower unit is guided laterally from the air discharge head in the hopper and upwardly through the material and outwardly from the air pervious cover on the hopper extension.

ORAN C. WILSON.

References Cited in the file of this patent

UNITED STATES PATENTS

| Number | Name | Date |
|---|---|---|
| 265,664 | English | Oct. 10, 1882 |
| 779,106 | Wegner et al. | Jan. 3, 1905 |
| 988,671 | Staunton | Apr. 4, 1911 |
| 1,496,094 | Moetteli | June 3, 1924 |
| 1,910,793 | Guinan | May 23, 1933 |
| 2,257,394 | Niersbach | Sept. 30, 1941 |
| 2,335,732 | Bowen | Nov. 30, 1943 |
| 2,474,952 | Miskella | July 5, 1949 |
| 2,535,829 | Beck | Dec. 26, 1950 |

FOREIGN PATENTS

| Number | Country | Date |
|---|---|---|
| 130,882 | Austria | Dec. 27, 1932 |